United States Patent [19]

Gras

[11] 4,430,134
[45] Feb. 7, 1984

[54] METALLIZED BOTTOM CONTAINER AND PROCESS OF OBTAINING THE SAME

[75] Inventor: Augustin H. Gras, Rochefort du Gard, France

[73] Assignee: Lauragri S.A., Noves, France

[21] Appl. No.: 292,089

[22] Filed: Aug. 12, 1981

Related U.S. Application Data

[63] Continuation of Ser. No. 120,033, Feb. 11, 1980, abandoned.

[30] Foreign Application Priority Data

Feb. 9, 1979 [FR] France .............................. 79 03921
Dec. 28, 1979 [FR] France .............................. 79 32039

[51] Int. Cl.³ ............................................ B31F 1/00
[52] U.S. Cl. .............................. 156/224; 156/244.22;
156/244.27; 156/270; 156/278; 156/282;
156/306.6; 156/309.9; 156/322; 156/324;
156/334; 206/557; 229/3.5 MF; 426/126;
428/35; 428/317.7; 428/318.6; 428/319.9
[58] Field of Search ............... 156/224, 306.6, 244.22,
156/322, 244.27, 324, 270, 334, 278, 309.9, 282;
428/35, 318.6, 317.7, 319.9, 910; 427/250;
426/126; 229/3.5 MF; 206/557

[56] References Cited

U.S. PATENT DOCUMENTS

| 2,494,905 | 1/1950 | Shumann ............................ 156/282 |
| 2,808,192 | 10/1957 | Raisin .................................. 426/126 |
| 2,815,308 | 12/1957 | Robinson et al. .............. 156/244.27 |
| 3,008,862 | 11/1961 | Haine et al. ..................... 156/244.22 |
| 3,039,911 | 6/1962 | Fox ....................................... 156/224 |
| 3,159,698 | 12/1964 | Suh et al. ............................ 156/224 |
| 3,502,540 | 3/1970 | Pietrocola ........................ 156/306.6 |
| 3,619,344 | 11/1971 | Wolinski et al. ................. 428/317.7 |

FOREIGN PATENT DOCUMENTS 54-3194 2/1979 Japan ................................. 427/250

Primary Examiner—John J. Gallagher
Attorney, Agent, or Firm—Sughrue, Mion, Zinn, Macpeak and Seas

[57] ABSTRACT

The invention relates to a process for continuously manufacturing a composite band comprising a plastic sheet bonded to an aluminized pellicle, these two components consisting of separate bands before carrying out the process. The composite band made by the process can be used for instance for insulating or padding. This band can also be used after cutting and thermoforming as a pan or container for perishable products such as meat. The perishable product is put in the pan, and both are covered with a plastic film to give a stocking and hygienic presentation. To carry out the process and to bond the basic plastic band (expanded polystyrene) to the aluminized pellicle, these two sheets are introduced between calendering cylinders with interposing between the two sheets an intermediate film of plastic material at softening temperature to provide the adhesion. Of course, it is the non-aluminized side of the pellicle which is in contact with the polystyrene basic band.

6 Claims, 7 Drawing Figures

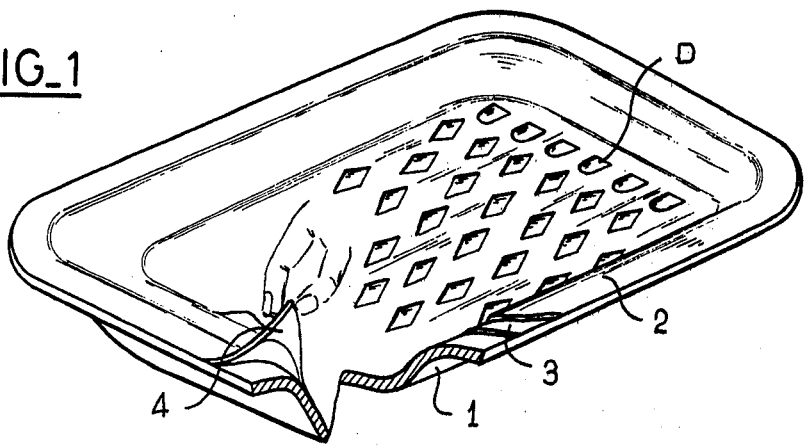
FIG_1
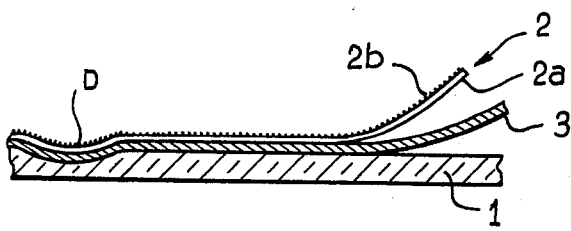
FIG_2
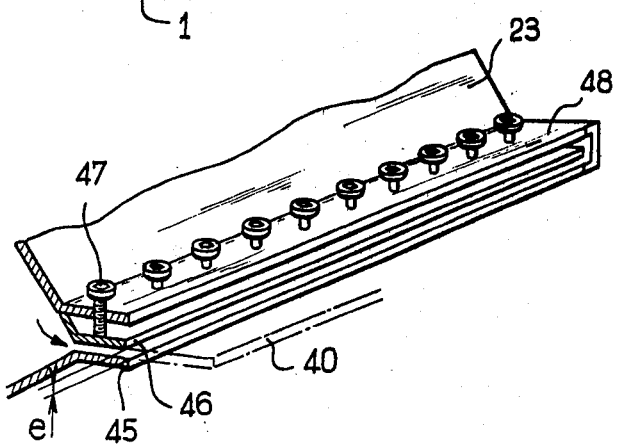
FIG_6
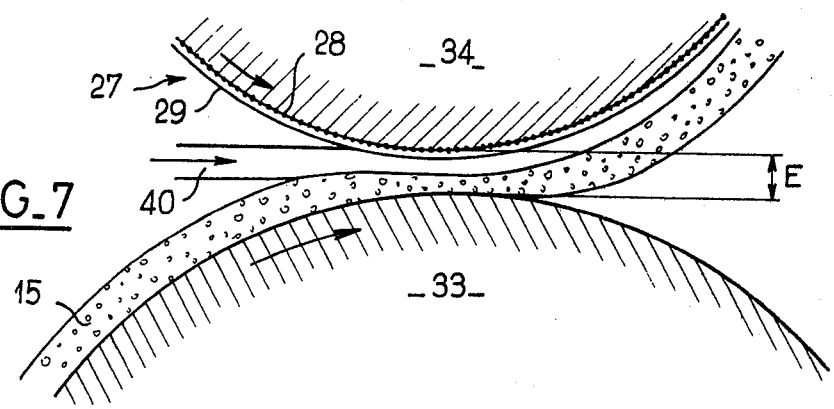
FIG_7

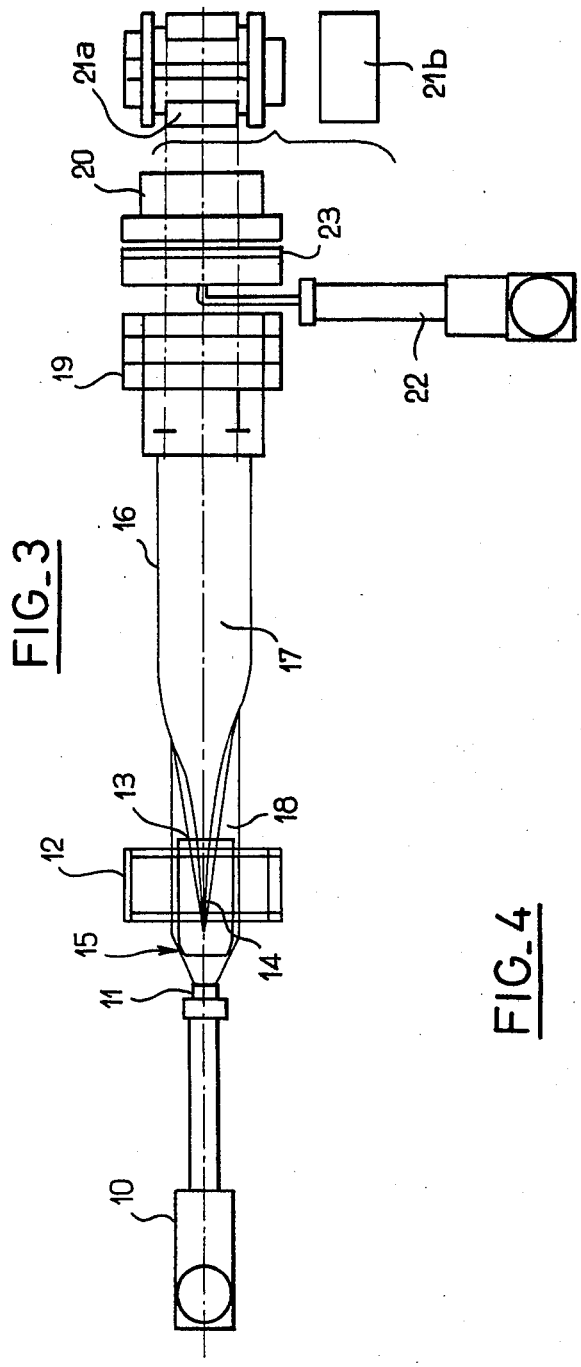
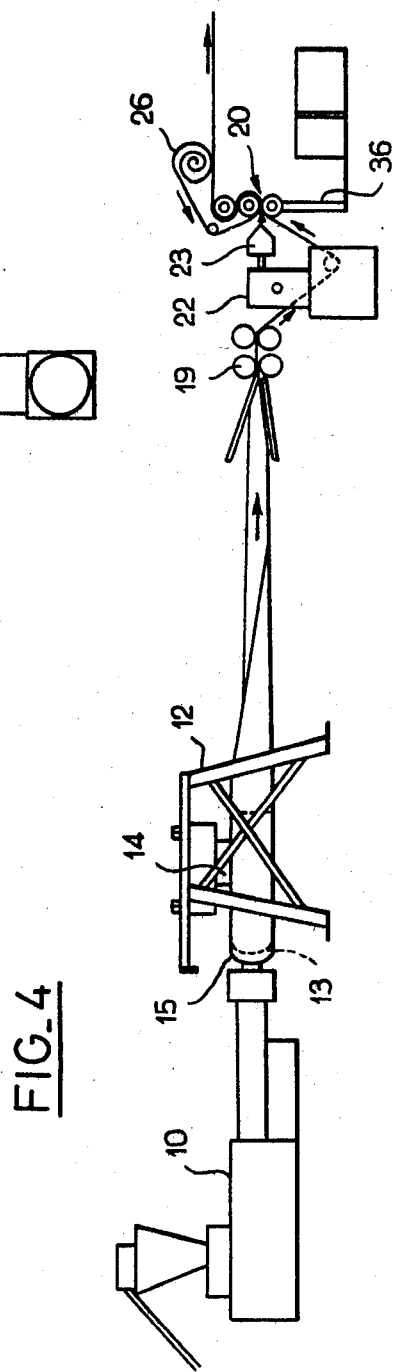
FIG_3
FIG_4

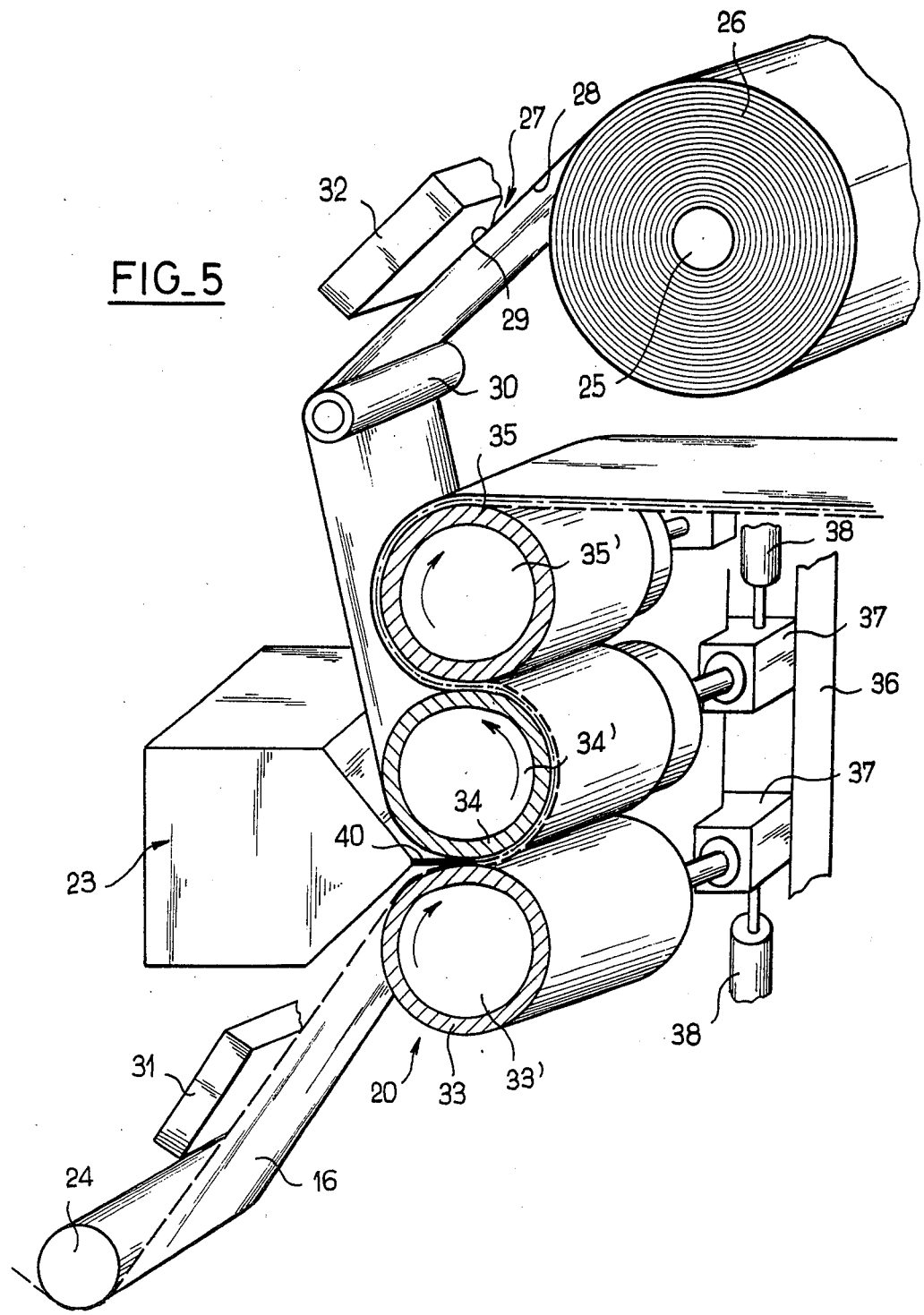
FIG_5

METALLIZED BOTTOM CONTAINER AND PROCESS OF OBTAINING THE SAME

This is a Continuation, of application Ser. No. 120,033, filed Feb. 11, 1980, now abandoned.

The present invention relates, firstly, to a packing article of the pan type for perishable products, such as fresh meat and other foodstuffs, said article being conceived in order to enable the stocking and hygienic presentation of such products beneath a synthetic film enveloping the pan and the product.

Packing articles of this type are known which are composed of a bottom of plastic material connected to a metallic coating on its interior surface which is intended to come into contact with the packed product. This internal coating is generally composed of a metallic sheet which is laid on or stuck to the bottom. Such articles are expensive to manufacture since they require the use of a metal which is compatible with the foodstuffs, in particular aluminum.

In its most general embodiment, the present invention relates to an article of this type which has a low cost and is simple to manufacture, wherein the metallic coating is applied to its support by vacuum pulverization of metallic particles, and in particular aluminum, which allows for the use of a metallic deposit of very diminished thickness.

In accordance with one more particular and preferred embodiment, the pulverization is effected onto a pellicle intimately contacted by welding to the bottom which itself is made of expanded polystyrene. A polystyrene pellicle pre-aluminized on one of its surfaces could be used.

The final article obtained allows for the conservation of the packed product with all its attractive qualities of freshness.

The manufacture of such an article can be carried out by direct projection of aluminum particles onto the bottom, but such an operation has the disadvantage of necessitating a metallic deposit of non-negligible thickness and of limiting the rhythm of manufacture. For this reason, applicant has perfected a much more economical process which allows manufacture of such articles at high speed without requiring the use of material which is too sophisticated.

In its most general embodiment, and this applies both for manufacture of an article in a continuous band and of a plurality of articles of limited dimensions, such as pans, the process of the present invention is characterized by the fact that a pellicle of thin plastic material is used, wherein one single surface is metallized by any known appropriate process, for example, by vacuum pulverization of metallic particles, and the bonding of the plastic material base element and the metallized surface of the pellicle is carried out by interposing between them an intermediate film of plastic material which is maintained at a temperature ensuring its softening, at least superficially, and providing adhesion of said film with the material of the element and of the pellicle, the bonding being effected under the action of at least local pressure in the bonding zone. The use of a metallized plastic material pellicle enables the use of only very little metal, in a layer of only a few hundredths or thousandths of microns, mechanical resistance being provided by the pellicle of plastic material which, also, will preferably be of diminished thickness (for example less than $30\mu$).

However, when working with a metallized pellicle of such diminished thickness, experience has shown that it is practically impossible to obtain a direct weld of the pellicle onto the plastic material base element.

Indeed, on the one hand, in order to obtain good bonding, the plastic materials to be contacted must be made adhesive by provision of considerable heat, but, on the other hand, this provision of heat risks deteriorating the metallic layer. The interposition of an intermediate film recommended by the present invention enables this paradox to be resolved under excellent conditions. To do this, at the time of bonding, the surfaces of the intermediate film are at a temperature such that the material of the film is in a sticky state, at least superficially, whereas the surfaces of the base element and of the pellicle which are intended to be contacted with the film are heated to a temperature below the softening temperature of the material of which they are composed.

This avoids bringing the metallized layer to an excessive temperature which would cause its deterioration, in particular in the preferred embodiment in which aluminum is used.

An advantage of the process of the present invention is that a plurality of composite articles can be continuously manufactured from a plastic material base element and from a metallized (for example, aluminized) pellicle which are in the form of continuous separate bands.

In this case, and in accordance with the invention,
  the element and the aluminized pellicle are unrolled simultaneously and are circulated between calendering cylinders, the non-aluminized surface of the pellicle being opposite the element band,
  and the continuous plastic material film which is inserted between the element and the non-aluminized surface of the pellicle is extruded while maintaining it at a temperature at least equal to its softening point,
  after which thermoforming and cutting of the composite band are carried out in order to obtain the articles.

Naturally, the plastic materials used should be compatible and according to one embodiment of the invention, the base element will be of expanded polystyrene whereas the metallized pellicle will be composed of a polystyrene film coated with a layer of aluminum, the intermediate film also being of non-expanded polystyrene (impact or semi-impact polystyrene).

In addition, applicant has been able to ascertain that the process of the invention, in the case of the execution of pans for packing of foodstuffs utilizing a base element in expanded polystyrene of a thickness of approximately 3 mm, a polystyrene pellicle aluminized on one surface of a thickness of approximately $25\mu$ and an intermediate polystyrene film of a thickness of approximately $30\mu$, provided perfect bonding of the strata to each other and integrally respected the characteristics of the aluminum (insulation function, external shiny appearance, etc.) when carried out under the following conditions:
  maintaining of the calender cylinder in contact with the aluminum layer at a temperature of between 90° and 110° C. and preferably between 94° and 104° C.
  maintaining of the extrusion head of the intermediate film at a temperature of between 225° and 240° C.
  distance of the head and of the contact zone between the base element and the aluminized pellicle as low as possible, i.e., less than 5 cm and preferably between 2 and 2.5 cm.

pressure exerted between the calender cylinders of between 4 and 5 Kg with a distance between them slightly less than the thickness of the expanded polystyrene element.

It will however be understood that these operating conditions are optimal conditions. They can vary in accordance with several parameters, and in particular:

thickness of the aluminized pellicle and in particular of the aluminum layer (higher temperatures can be used if the thickness is increased);

output of the intermediate polystyrene film at the head. Thus, if the flow of the film (therefore the thickness of said film) is increased, lower head temperatures could be used;

temperature of the head.

It will be noted that the adjustment of these parameters will be guided by the appearance of the aluminum layer examined on the finished articles.

Finally, the invention relates to a machine for the carrying out of the process of the invention which comprises:

a calender composed of at least two cylinders turning in opposite directions, means for feeding the calender, on the one hand, with expanded plastic material in the form of a ravelling and, on the other hand, with a pellicle which is metallized on one surface and which is also in the form of a ravelling band, means for introducing into the calender and between the expanded element and the non-metallized surface of the pellicle, an intermediate plastic material film compatible with the expanded element and the pellicle so as to effect their bonding.

Delivery means for the intermediate film are composed of an extruder feeding a flat head wherein the output port is appreciably rectangular, the length of said head extending in a direction parallel to the axes of the cylinders and at least equal to the width of the band of expanded plastic material and of the metallized pellicle.

The invention is described by reference to the attached drawings which are given as non-limitative examples, and in which:

FIG. 1 represents a perspective view, partially cut away, of a packing pan obtained in accordance with the preferred process of the invention;

FIG. 2 represents schematically a transversal cross section of the pan of FIG. 1;

FIG. 3 is a schematic view from above of a machine according to the invention;

FIG. 4 is a schematic elevated view of the machine of FIG. 3;

FIG. 5 is a schematic perspective view on a larger scale of the calender of the machine;

FIG. 6 is a cut perspective detail showing the head of the extruder delivering the intermediate film; and FIG. 7 shows, schematically, on an enlarged scale, the bonding zone of the calender.

As indicated above, the pan of the invention can be made from an expanded polystyrene bottom 1 whose interior surface is coated with a layer of vacuum pulverized aluminum. This type of pan is not shown.

FIG. 1 shows a pan for the packing of edible products, for example meat, intended to be completed, after the placing of the product, with an envelope (plastic film) covering both the product and the pan. This pan, made in accordance with the preferred process of the invention, comprises a base element 1 made of expanded polystyrene which insures the mechanical holding of the article. The interior surface of the pan is covered with an aluminized pellicle composed of a polystyrene film 2a whose exterior surface (see FIG. 2) is aluminized, i.e., coated with a layer of aluminum 2b by any known appropriate process. This layer can be of a thickness on the order of 0.05 to 0.1μ.

Preferably a commercially available bioriented polystyrene film is used as support for the aluminum layer.

This film is transparent and after aluminization, the aluminized pellicle 2 is shiny on both its surfaces. If the exterior surface of the pellicle covering the pan is scratched, the shiny aluminum layer is removed and the milky white color of the expanded polystyrene appears therethrough.

Between the pellicle 2 and the expanded polystyrene element 1 an intermediate polystyrene film 3 is interposed which serves as an addition material to ensure bonding during the weld of the assembly as indicated above.

When an attempt is made to detach the film on the completed pan, as is shown in FIG. 1, the material of the film 3 is adhesive to the polystyrene of the pellicle. The interior surface 4 of the detached part indeed has a whitish appearance which is duller than the natural surface 2a of the pellicle. This is a sign that the film 3 is well adhered to the pellicle 2. By carefully scratching the interior surface 4 of the detached part, the film 3 can be removed and the original shiny appearance of the pellicle 2 reappears.

The adhesion of the film to the expanded polystyrene is less strong due to the alveolar structure of the expanded polystyrene.

It will be noted that preferably depressions D (FIGS. 1 and 2) are formed in the metallized surface of the pan and said depressions comprise micro-channels intended to hold any blood which may drain from fresh meat, any juices or any seepage from food products. Through capillarity and surface tension, said channels hold the fluids which are no longer spread out, without, however, degrading the product by contact with said fluids. The "absorbent" effect of these micro-channels is such that, even if overturned, the fluid spread along said micro-channels does not move and remains the "captive" of these capillary channels. Additionally, these channels can be in the form of grooves or of checkering. The bottom of the depressions D remains separated from the packed foodstuff which rests only on the upward projecting parts of the bottom.

At present a machine enabling the carrying out of the process of the invention will be described.

The machine shown in FIGS. 3 and 4 comprises an extruder 10 head line/channel delivers an expanded polystyrene element which, in the example shown, exits in the form of a tube 15, the head 11 being tubular and a mandrel 13 supported by a structure 12 being provided; the structure comprises, above the mandrel 13, a cutting blade 14 which opens the tube in accordance with a higher generator, the polystyrene element then opening in the form of a flat band 16; the exterior wall 18 of the tube, smoothed by passage in the head is therefore underneath and the rougher interior wall 17 is above. It is onto this interior wall that the intermediate film will be welded, the exterior wall 18 with a better appearance becoming the lower surface of the pan.

The expanded polystyrene band 16 of a thickness of approximately 3 mm is pulled by a classical traction apparatus 19 which is followed by a calender 20, which will be described in detail below. Between the traction apparatus and the calender is situated the flat head 23 of an extruder 22 delivering the intermediate polystyrene film.

On exit from the calender, the assembly composed of the aluminized pellicle bonded to the expanded polystyrene band is:

either wound on a winder 21a to be stocked while awaiting use, or directly conveyed under a pressing and cutting unit schematized at 21b which carries out the forming (preferably by heat) and the cutting of the band in order to obtain a plurality of pans such as that shown in FIG. 1.

The aluminized pellicle 27 of a thickness on the order of $25\mu$ (see FIG. 5) is unwound from a roller 26 mounted on an axis 25 supported by the frame of the machine, in such a manner that the aluminum layer is on the interior surface 28, the polystyrene film 29 being on the exterior. The pellicle 27 is guided onto a roller 30.

Before reaching the calender 20, the polystyrene film 29 of pellicle 27 is warmed by a heating system 32 (for example, infrared) to a temperature of 70°, 85° C. Similarly, the exterior surface of the band 16 is heated in the same manner to a temperature of 80° to 95° C., which temperature is lower than the softening temperature of polystyrene.

The calender is composed of three cylinders 33, 34, 35, whose axes extend horizontally in a same vertical plane. The cylinders are supported by the frame 36 of the machine and at least the two lower cylinders 33 and 34 are adjustable one in relation to the other in order to adjust the space E which separates them. For this purpose, the axes of these cylinders may be housed in the bearings 37 sliding in the frame 36 under the effect of jacks 38, for example by compressed air.

The cylinder 33 over which passes the expanded polystyrene band 16 turns clockwise, whereas the cylinder 34 over which passes the pellicle 27 turns anticlockwise. The third cylinder 35 turns in the same sense as the cylinder 33.

The distance E between the cylinders 33 and 34 is adjusted so as to be slightly less than the thickness of the band 16 so as to exert pressure on the assembly of the bands at the time of bonding. In the example shown, the pressure exerted between the cylinders in the bonding zone is approximately 4 to 5 kg.

Upstream from the calender, on the frame of the machine, the flat head 23 of the extruder 22 which delivers the intermediate film 40 is mounted. This head, which has a length at least equal to that of the band 16, has two practically parallel lips 45, 46 which are separated by a distance "e" which, in the case of manufacture of the pan of FIG. 1, provides continuous delivery of a polystyrene film of a thickness of approximately $30\mu$.

Preferably, lip 46 is semi-rigid and the distance "e" can be modified from place to place by adjustment screws 47 inserted into tappings in a fixed plate 48 where the free end presses on lip 46. In this manner the length of the output of the head can be modulated.

The output port of the head is situated in a transversal plane (practically perpendicular) to the vertical plane passing by the axes of the calender cylinders and between the generators opposite cylinders 33 and 34.

In addition, this output port should be as near as possible to the contact zone between the band 16 and the pellicle 27. In the example shown, this port is situated at less than 5 cm from this zone and preferably between 2 and 2.5 cm. The temperature of the head exceeds 200° C. and preferably is regulated between 225° and 240° C.

Moreover, cylinder 34 is heated to a temperature of between 90° and 110° C. according to the thickness of the aluminized pellicle and preferably between 94° and 104° C. for a pellicle thickness of approximately $25\mu$.

Cylinder 35 is also heated to a similar temperature.

However, cylinder 33 is cooled to remain at the ambient temperature of approximately 20° to 35° C.

The heating of the cylinders can be effected by heat-bearing fluid circulation in the hollow interior 34', 35' of the cylinders. Similarly, the cooling of cylinder 33 can be effected by circulation of a cooling fluid in the interior 33'.

By appropriate adjustment of the temperatures at the level of the calender, good adhesion of the various layers can be effected without deterioration of the aluminium, particularly with respect to its appearance.

This is due to the fact that the aluminized pellicle is maintained by cylinder 34 at a sufficiently low temperature so as not to deteriorate the metal. However, this temperature is not sufficient to provide the softening of the polystyrene pellicle necessary for bonding. The provision of additional temperature is furnished by the film 40 which is in a surface tacky state. The provision of temperature remains nevertheless within limits preventing the deterioration of the metal since a large part of the temperature of the film is absorbed by the expanded polystyrene 15 and by the cooled cylinder 33.

What is claimed is:

1. The process of continuous manufacture of composite articles by manufacturing a composite band for packing products such as meat, said process comprising the steps of:

unwinding a relatively thin film of bi-directional polystyrene coated with a layer of aluminum and simultaneously a relatively thick band of expanded polystyrene and circulating them between opposed calendering cylinders with the non-aluminized surface of the film of bi-directional polystyrene facing the band of expanded polystyrene, and extruding a continuous intermediate film of polystyrene from an extruder head and inserting said extruded continuous film between the band of expanded polystyrene and said film of bi-directional polystyrene in a contact zone therebetween while applying pressure between said calendering cylinders, and maintaining said extruded continuous film at a temperature at least equal to its softening point to cause the surface of the film of bi-directional polystyrene and the surface of the band of expandable polystyrene contacting said continuous extruded film to soften to effect thermobond adhesion of said continuous extruded film to said band of expanded polystyrene and to said film of bi-directional polystyrene while heating the calendering cylinder in contact with the aluminum layer of said film of bi-directional polystyrene to maintain a relatively high temperature for said layer of aluminum to prevent said layer of aluminum from drawing heat thereto and while cooling of said calendering cylinder in contact with said polystyrene band to maintain that cylinder at near ambient temperature, whereby said expanded polystyrene band in contact with the cooled cylinder functions with the cooled cylinder to draw heat away from said extruded continuous intermediate film of polystyrene to prevent damage of said layer of aluminum, and thermal forming and cutting of said composite band to obtain a composite article.

2. The process of claim 1, wherein before bonding is carried out, at least the surface of the band and of the bi-directional polystyrene film which are intended to contact the intermediate film are heated to a temperature lower than the softening temperature of the material of which they are composed.

3. The process of claim 1, further comprising the step of maintaining the distance from the output of the extruder head and the contact zone between the expanded polystyrene band and the aluminized bi-directional polystyrene film to less than five centimeters.

4. The process of claim 1, wherein during the calendering operation said cylinder in contact with the aluminum layer is heated to a temperature between 90° and 110° C., and said process further comprises the step of adjusting the distance between cylinders to a size slightly less than the thickness of the expanded polystyrene band, and said process further comprises exerting a pressure of between 4 and 5 kg between the cylinders.

5. The process of claim 4, further comprising the step of maintaining the temperature of the heat of the intermediate film extruder to between 225° and 240° C.

6. The process of claim 5, further comprising the step of maintaining the distance from the output of the extruder head and the contact zone between the expanded polystyrene band and the aluminized bi-directional polystyrene film to less than five centimeters.

* * * * *